(12) United States Patent
Davis et al.

(10) Patent No.: US 8,301,767 B1
(45) Date of Patent: Oct. 30, 2012

(54) SYSTEM, METHOD AND COMPUTER PROGRAM PRODUCT FOR CONTROLLING NETWORK COMMUNICATIONS BASED ON POLICY COMPLIANCE

(75) Inventors: Michael Anthony Davis, Orland Park, IL (US); Joe C. Lowe, Aloha, OR (US); Arthur S. Zeigler, Salem, OR (US)

(73) Assignee: McAfee, Inc., Santa Clara, CA (US)

( * ) Notice: Subject to any disclaimer, the term of this patent is extended or adjusted under 35 U.S.C. 154(b) by 1035 days.

(21) Appl. No.: 11/313,605

(22) Filed: Dec. 21, 2005

(51) Int. Cl.
*G06F 15/173* (2006.01)
*G06F 15/16* (2006.01)

(52) U.S. Cl. .......... 709/225; 709/224; 709/229; 726/11; 726/22

(58) Field of Classification Search .................. 709/206, 709/223, 224, 225, 229, 232; 726/1, 2, 22, 726/26, 11
See application file for complete search history.

(56) References Cited

U.S. PATENT DOCUMENTS

| | | | | |
|---|---|---|---|---|
| 5,550,976 | A | 8/1996 | Henderson et al. | 395/200.06 |
| 5,832,208 | A | 11/1998 | Chen et al. | 395/187.01 |
| 5,937,160 | A | 8/1999 | Davis et al. | 709/238 |
| 5,987,611 | A * | 11/1999 | Freund | 726/4 |
| 6,044,402 | A * | 3/2000 | Jacobson et al. | 709/225 |
| 6,070,244 | A * | 5/2000 | Orchier et al. | 726/1 |
| 6,075,863 | A | 6/2000 | Krishnan et al. | 380/49 |
| 6,088,803 | A | 7/2000 | Tso et al. | 713/201 |
| 6,119,165 | A | 9/2000 | Li et al. | 709/229 |
| 6,205,551 | B1 | 3/2001 | Grosse | 713/201 |
| 6,266,704 | B1 | 7/2001 | Reed et al. | 709/238 |
| 6,269,447 | B1 | 7/2001 | Maloney et al. | 713/201 |
| 6,327,579 | B1 | 12/2001 | Crawford | 705/400 |
| 6,622,150 | B1 | 9/2003 | Kouznetsov et al. | 707/200 |
| 6,622,230 | B1 * | 9/2003 | Yano et al. | 711/209 |
| 6,718,469 | B2 | 4/2004 | Pak et al. | 713/200 |
| 6,725,377 | B1 | 4/2004 | Kouznetsov | 713/201 |
| 6,832,321 | B1 * | 12/2004 | Barrett | 726/11 |
| 6,839,850 | B1 * | 1/2005 | Campbell et al. | 726/23 |
| 6,892,241 | B2 | 5/2005 | Kouznetsov et al. | 709/229 |
| 6,920,558 | B2 | 7/2005 | Sames et al. | 713/166 |
| 7,003,562 | B2 * | 2/2006 | Mayer | 709/223 |
| 7,249,187 | B2 * | 7/2007 | Sobel et al. | 709/229 |
| 7,293,099 | B1 * | 11/2007 | Kalajan | 709/230 |
| 7,436,783 | B2 * | 10/2008 | Cheshire et al. | 370/254 |
| 7,454,488 | B2 * | 11/2008 | Wechter et al. | 709/223 |
| 7,610,624 | B1 * | 10/2009 | Brothers et al. | 726/24 |

(Continued)

FOREIGN PATENT DOCUMENTS

JP 06070448 10/1995

(Continued)

OTHER PUBLICATIONS

"SonicWALL Network Anti-Virus: The Problem".

(Continued)

*Primary Examiner* — Kamal Divecha
(74) *Attorney, Agent, or Firm* — Patent Capital Group (57) ABSTRACT

A policy management system, method and computer program product are provided. In use, information is received over a network relating to at least one subset of computers that are at least potentially out of compliance with a policy. Further, such information is sent to a plurality of the computers, utilizing the network. To this end, network communication involving the at least one subset of computers is capable of being controlled utilizing the information.

22 Claims, 6 Drawing Sheets

U.S. PATENT DOCUMENTS

| | | | | |
|---|---|---|---|---|
| 7,792,994 | B1* | 9/2010 | Hernacki | 709/245 |
| 7,836,506 | B2* | 11/2010 | Liu | 726/25 |
| 2003/0158929 | A1* | 8/2003 | McNerney | 709/223 |
| 2004/0019807 | A1* | 1/2004 | Freund | 713/201 |
| 2004/0258044 | A1* | 12/2004 | Girouard et al. | 370/352 |
| 2005/0060417 | A1* | 3/2005 | Rose | 709/228 |
| 2005/0081045 | A1* | 4/2005 | Nicodemus et al. | 713/182 |
| 2005/0144279 | A1* | 6/2005 | Wexelblat | 709/225 |
| 2005/0172142 | A1* | 8/2005 | Shelest et al. | 713/191 |
| 2005/0182949 | A1* | 8/2005 | Phillips et al. | 713/189 |
| 2005/0246767 | A1* | 11/2005 | Fazal et al. | 726/11 |
| 2005/0273850 | A1* | 12/2005 | Freund | 726/14 |
| 2006/0075103 | A1* | 4/2006 | Cromer et al. | 709/225 |
| 2007/0073874 | A1* | 3/2007 | Moghaddam et al. | 709/224 |
| 2011/0078795 | A1* | 3/2011 | Liu | 726/23 |

FOREIGN PATENT DOCUMENTS

| | | |
|---|---|---|
| WO | 99/05814 | 2/1999 |
| WO | 03/030001 | 4/2003 |

OTHER PUBLICATIONS

"SonicWALL Network Anti-Virus: The Solution".
"SonicWALL Network Anti-Virus Benefits".
"SonicWALL Network Anti-Virus-Details".
Jansen et al., Applying Mobile Agents to Intrusion Detection and Response; www.itl.nist.gov/div893/staff/mell/maresponse.pdf.
Gordon, Real World Anti-Virus Products Reviews and Evaluations (1996); csrc.nist.gov/nissc/1996/NISSC96/paper019/final.pdf
Using Mobile Agent Results to Create Hard-to-Detect Computer Viruses—Wang; www.cs.uwm.edu/~wang/papers/virus.ps.gz.
Java and Internet Security—Viljamaa, Viljamaa (1998); www.sc.helsinki.fi/group/fred/reports/JavaSecurityReportFinal.ps.gz.
Keizer, Gregg—ZoneAlarm Product Firewalls Spyware—Network Computing's desktoppipeline, Oct. 19, 2005.
Symantec—Sygate Secure Enterprise, Sygate Technologies, Inc. 2005.
Sygate Secure Enterprise—The Problem, Sygate Technologies, Inc. 2004.
Office Action from U.S. Appl. No. 09/968,106 mailed May 24, 2004.
Written Opinion from PCT/US02/29302 mailed May 19, 2003.
International Search Report from PCT/US02/29302 mailed Dec. 18, 2002.
International Preliminary Examination Report from PCT/US02/29302 mailed Jul. 21, 2004.
Notice of Allowance from U.S. Appl. No. 09/968,106 mailed on Jul. 27, 2004.
Supplemental Notice of Allowance from U.S. Appl. No. 09/968,106 mailed on Nov. 12, 2004.

* cited by examiner

SYSTEM, METHOD AND COMPUTER PROGRAM PRODUCT FOR CONTROLLING NETWORK COMMUNICATIONS BASED ON POLICY COMPLIANCE

FIELD OF THE INVENTION

The present invention relates to network policies, and more particularly to policy enforcement.

BACKGROUND

The recent explosion of distributed computing systems and their attendant problems have led to many innovative solutions to ensure commonality, interoperability, and standardization. In order to both provide authorized access and prevent unwanted access, administrators establish policies for distributed computing systems under their control. These policies include firewall policies, file access policies, application-related policies, encryption policies, audit trail policies, activity logging policies, etc.

Unfortunately, if any particular computer in the aforementioned distributed computing system is not compliant with any particular desired policy, the remaining computers in the system may be detrimentally affected. Such affects may range from security-related problems to more benign issues such as performance reduction, inconvenience, etc.

There is thus a need for overcoming these and/or other problems associated with the prior art.

SUMMARY

A policy management system, method and computer program product are provided. In use, information is received over a network relating to at least one subset of computers that are at least potentially out of compliance with a policy. Further, such information is sent to a plurality of the computers, utilizing the network. To this end, network communication involving the at least one subset of computers is capable of being controlled utilizing the information.

DETAILED DESCRIPTION

Figure 1:
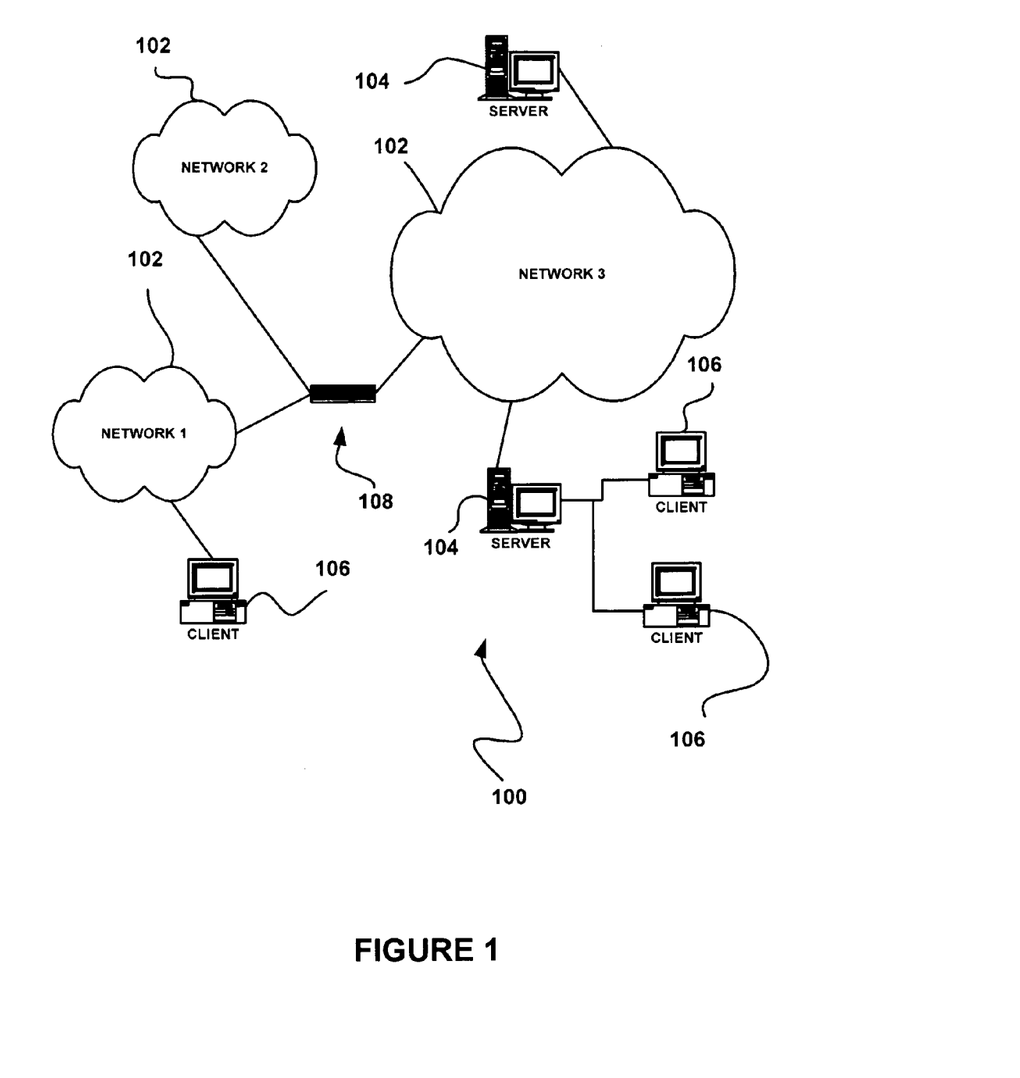
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

It should be noted that any of the foregoing computers in the present network architecture 100 may be equipped with a policy management system, method and/or computer program product. In use, information is received over one or more of the networks 102. Such information may include any data that relates to at least one subset of computers 104 and/or 106 that are at least potentially out of compliance with a policy. In the context of the present description, such policy may include one or more firewall policies, file access policies, application-related policies, encryption policies, audit trail policies, activity logging policies, and/or any other plan and/or course of action intended to influence and/or determine decisions, actions, and/or other matters associated with the computers 104 and/or 106, and/or one or more of the networks 102.

Such information is then, in turn, sent to a plurality of the computers 104 and/or 106 utilizing the one or more of the networks 102. Of course, the term "information" in the context of the send operation may include the entire set of information received, a portion thereof, a processed form of the received information, and/or any other data that again relates to the at least one subset of computers 104 and/or 106 that are at least potentially out of compliance with a policy. Further, the computers 104 and/or 106 to which the information is sent may or may not include some or all of the computers 104 and/or 106 including or excluding the out of compliance computers 104 and/or 106.

To this end, network communication involving the at least one subset of computers 104 and/or 106 is capable of being controlled utilizing the information. More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
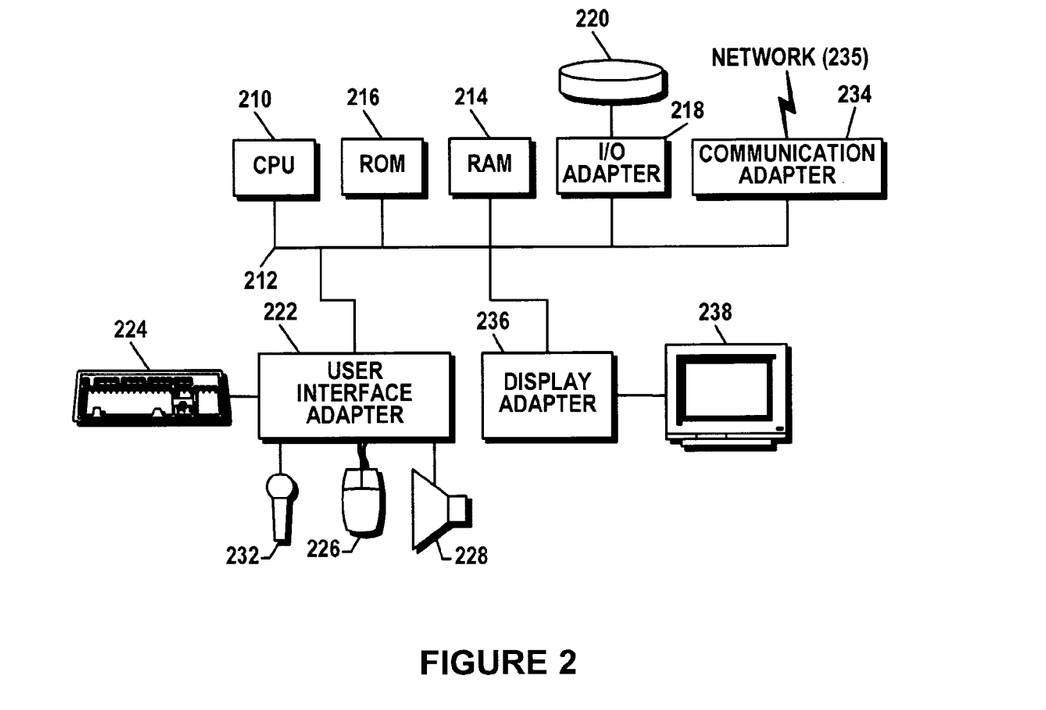
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
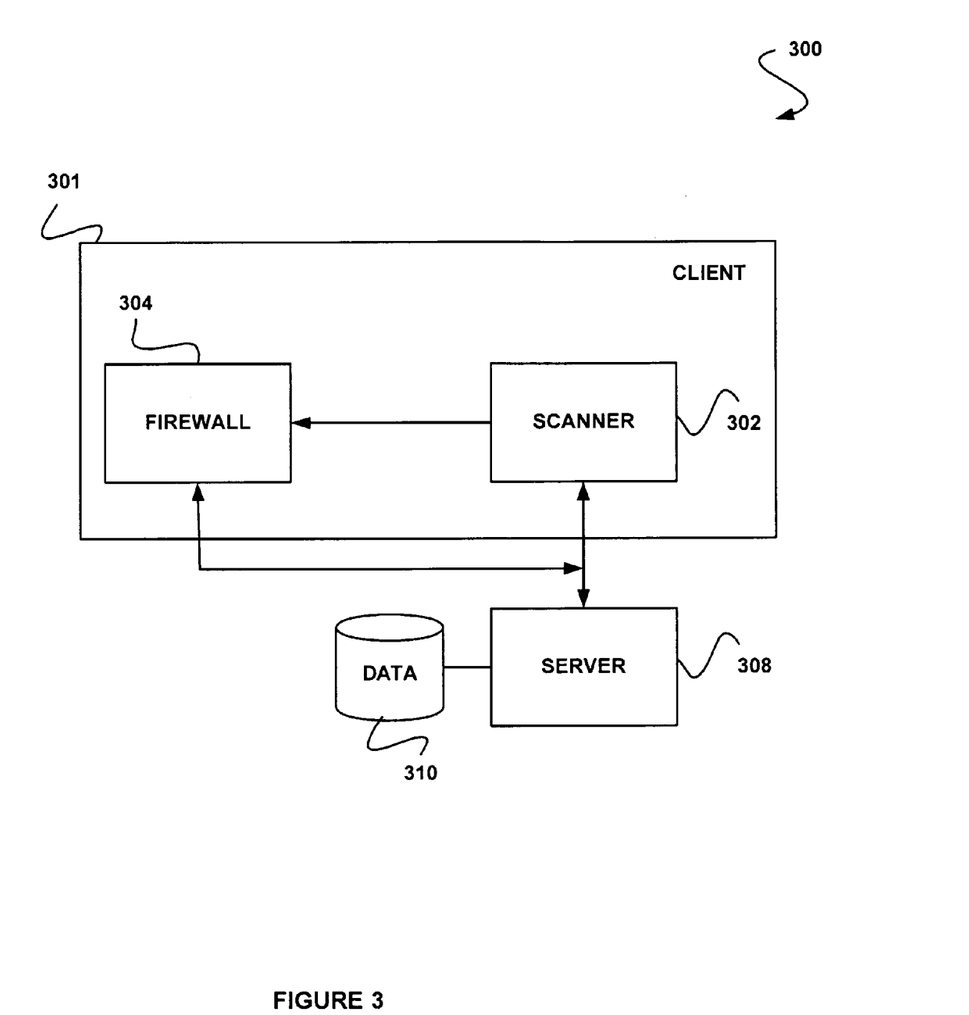
FIG. 3 shows a system for controlling network communication based on policy compliance, in accordance with one embodiment.

FIG. 3 shows a system 300 for controlling network communication based on policy compliance, in accordance with one embodiment. As an option, the present system 300 may be implemented in the context of the architecture and environment of FIGS. 1 and/or 2. Of course, however, the system 300 may be carried out in any desired environment. Further, the aforementioned definitions may equally apply to the description below.

As shown, one or more client computers 301 (e.g. see, for example, the client computers 106 of FIG. 1, etc.) are included. Further, at least a portion of such client computers 301 includes a policy scanner 302 in communication with a firewall 304. The policy scanner 302 may include any module capable of detecting any aspect of the client computer 301 that is at least potentially out of compliance, and providing information relating to the same. Still yet, the firewall 304 may include any module capable of controlling network communication involving the client computer 301.

Of course, while the policy scanner 302 and the firewall 304 are shown to be included with the client computer 301 as separate modules, it should be noted that they may be combined in any capacity as well as be external to the client computer 301, as desired. Still yet, in various embodiments, one policy scanner 302 and/or firewall 304 may be allocated to more than one client computer 301.

Further provided is a server 308 (e.g. see, for example, the server computers 104 of FIG. 1, etc.) in communication with the client computer 301 via one or more networks (e.g. see, for example, the networks 102 of FIG. 1, etc.). Such server 308 is equipped with an external or internal database 310 for storing the aforementioned information provided by the policy scanner 302 and/or processed forms of such information in the form of one or more white lists and/or black lists. To this end, the server 308 is adapted for tracking at least one subset of the client computers 301 that are deemed to be out of compliance.

In use, the policy scanner 302 is adapted to provide the server 308 with information relating to any aspect of the associated client computer 301 that is found to be at least potentially out of compliance. Still yet, the policy scanner 302 may, upon detecting such out of compliance status, communicate with the firewall 304 for immediately controlling network communication involving the client computer 301 on which it is installed.

Thereafter, the server 308 may store and/or process such information received from the policy scanner 302. Armed with such information, the server 308 is further adapted to communicate with other computers for the purpose controlling network communication involving such other computers with respect to the client computer 301 utilizing respective firewalls 304. Thus, not only is an out of compliance client computer 301 controlled in the manner it communicates with other computers, but such other computers are also controlled in the manner in which they communicate with the out of compliance client computer 301. To this end, two-way dynamic quarantining may optionally be established in order to optimally isolate out of compliance computers.

It should be noted that the receipt and sending of information may be carried out utilizing any desired push and/or pull techniques on a periodic or other basis. For example, instead of a periodic sharing of information, the information may be received and/or sent only upon it being determined that a compliance status of at least one of the computers has changed.

In one embodiment, the aforementioned network communication control may be carried out utilizing the aforementioned white and/or black list(s) stored in the database 310. More exemplary information regarding such functionality, according to various embodiments, will be set forth in greater detail during reference to subsequent figures.

Figure 4:
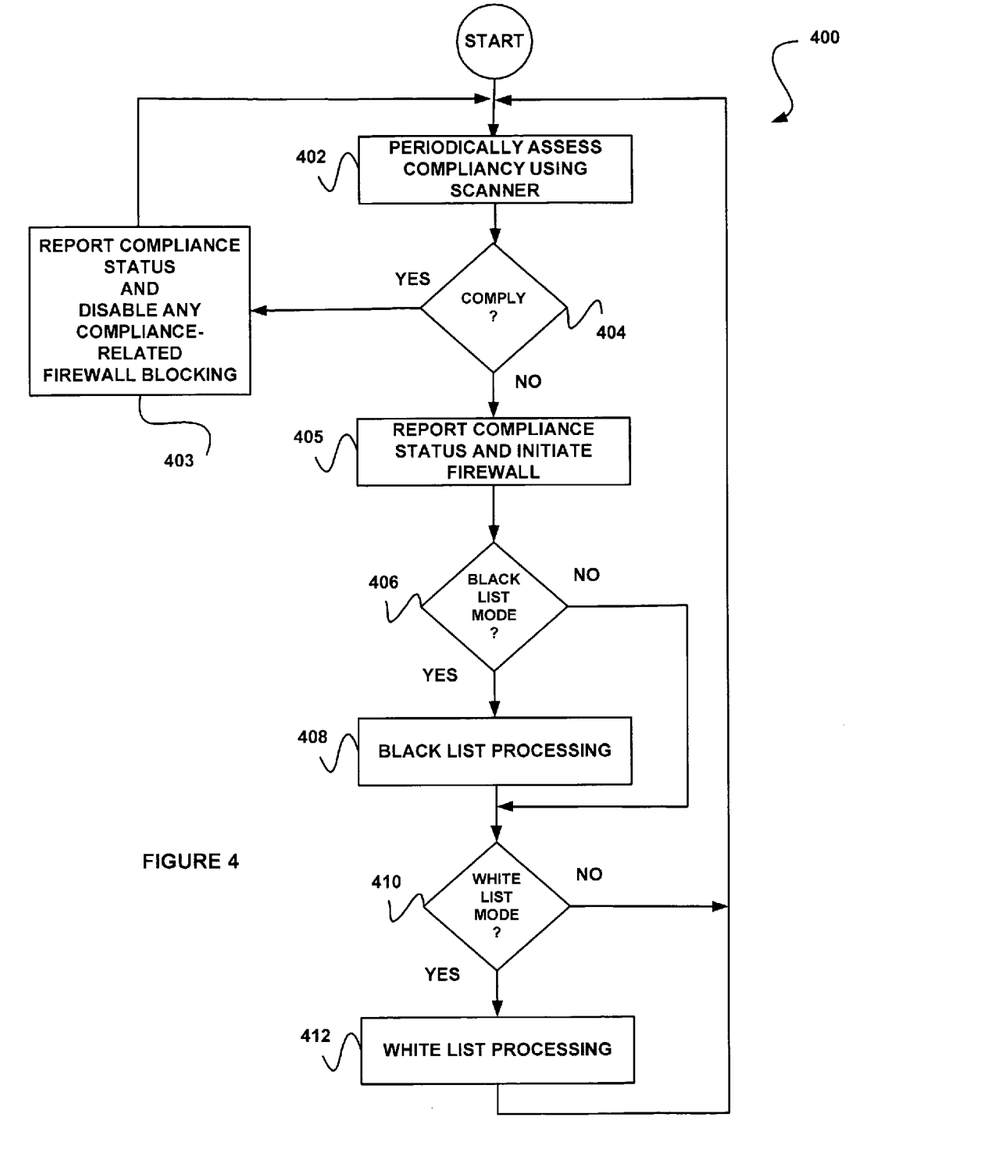
FIG. 4 shows a method for controlling network communication based on policy compliance, in accordance with one embodiment.

FIG. 4 shows a method 400 for controlling network communication based on policy compliance, in accordance with one embodiment. As an option, the present method 400 may be implemented in the context of the architecture and environment of FIGS. 1 and/or 2, and further in the context of the policy scanner 302 of FIG. 3. Of course, however, the method 400 may be carried out in any desired environment. Again, the aforementioned definitions may equally apply to the description below.

As shown, compliancy is periodically assessed using a scanner (e.g. see, for example, the policy scanner 302 of FIG. 3, etc.). Note operation 402. Of course, such compliancy may be continuously assessed, or upon the identification of an event that may potentially impact compliancy, if desired.

Then, in decision 404, it is determined whether the one or more computers managed by the scanner are in compliance under one or more policies. For example, such decision may be made based on a particular setting, whether an update has been installed, whether a particular application (e.g. virus scanner, intrusion detector, etc.) is installed and/or running, whether a particular behavior has been recognized (e.g. utilizing a pattern detection technique, heuristics, etc.), etc. Of course, such determination may be made in any desired manner that detects any sort of manifestation that at least potentially indicates at least a potential violation of a policy.

If it is determined in decision 404, that the one or more computers is out of compliance under one or more policies, information relating to such policy violating computer may be reported to a server (e.g. see, for example, the server 308 of FIG. 3, etc.) and a firewall (e.g. see, for example, the firewall 304 of FIG. 3, etc.) may be initiated. Note operation 405.

For example, such information may include an identification of the out of compliance computer(s) in the form of an Internet Protocol (IP) address, user name, etc. Further, for reasons that will soon become apparent, the information may also describe a nature (e.g. severity, urgency, which policies where violated, etc.) of the policy violation, and/or a description of the activities, behavior, etc. that prompted the violation, etc. As will soon become apparent, such information may be used in the compilation of black and/or white list(s).

Next, the initiation of the firewall may prompt black list processing in operation 408 and/or white list processing in operation 412, based on a mode in which the present method 400 is operating per decisions 406 and 410, respectively. Of course, such modes may be predetermined or dynamic based on user input and/or any automated logic, etc. More information regarding the white list processing in operation 412 will be set forth in greater detail during reference to FIG. 5 while more information regarding the black list processing in operation 408 will be set forth in greater detail during reference to FIG. 6.

Referring back to decision 404, if it is determined that the one or more computers managed by the scanner is indeed compliant under one or more policies, information relating to such policy compliance may be reported to a server, and any previously enabled firewall black or white list-based blocking may be disabled with respect to the particular computer that is now found to be compliant. Of course, such action may be conditioned on whether the computer was out of compliance in the first place, in order to preserve bandwidth, processing resources, etc.

Thus, the compliancy status of each computer equipped with the present functionality is constantly updated so as to 1) adjust the onboard blocking functionality of such computer, as well as 2) update the server so that the blocking functionality of any remaining computers may be similarly adjusted.

Figure 5:
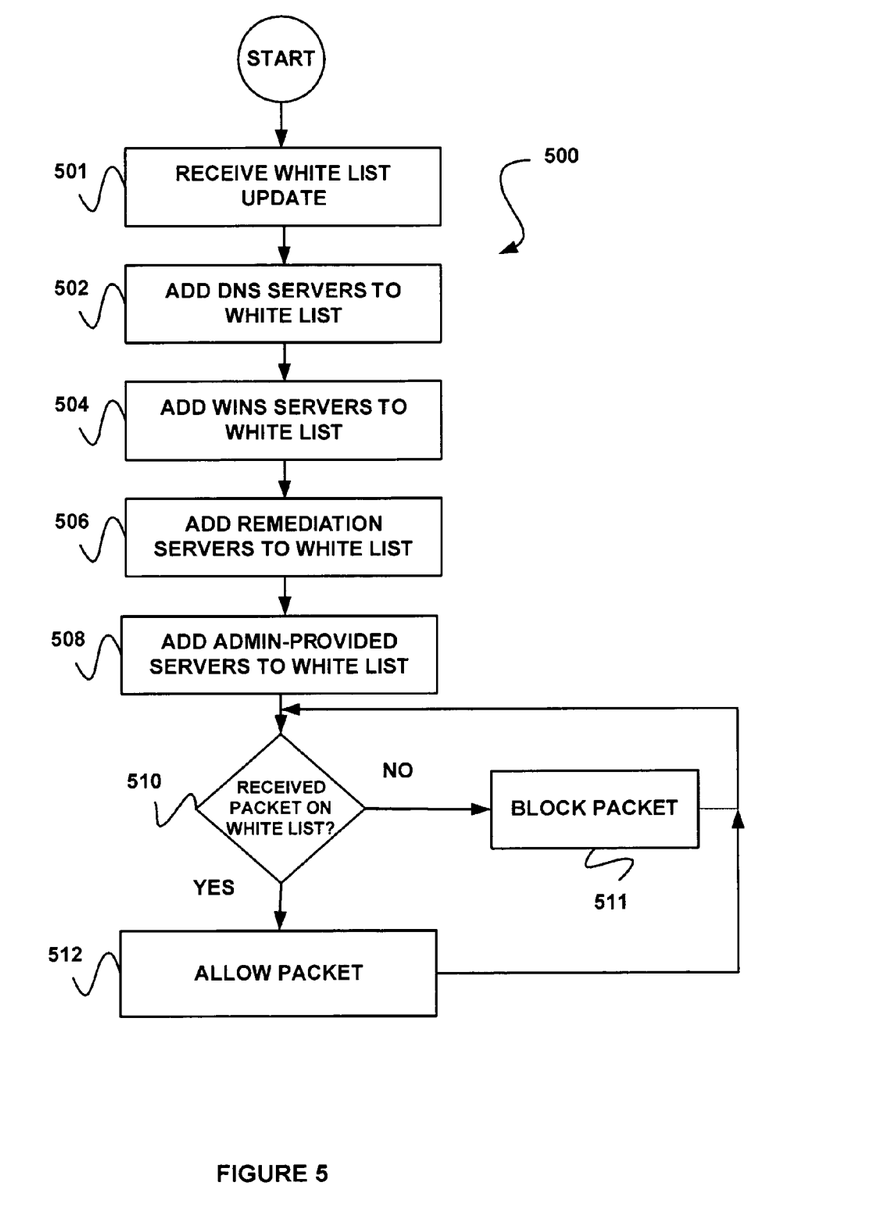
FIG. 5 shows a method for white list processing, in accordance with one embodiment.

FIG. 5 shows a method 500 for white list processing, in accordance with another embodiment. As an option, the present method 500 may be implemented in the context of the architecture and environment of FIGS. 1 and/or 2, and further in the context of the operation 412 of FIG. 4. Of course, however, the method 500 may be carried out in any desired environment.

While not shown, before the method 500 proceeds with the operations shown, the associated white list may be "reset," by denying communication with all computers. Thereafter, a white list update may be carried out in operation 501 for receiving an updated current white list reflecting all computers currently found to be compliant with relevant policies.

In addition to such computers, various other computers may be added which meet certain criteria. For example, in operation 502, the white list is amended to include at least one domain name server (DNS) so a computer is capable of converting hostnames to IP addresses for remediation and/or other purposes. Further, in operation 504, the white list is amended to include a Windows Internet name server (WINS) so the computer is capable of converting NetBIOS names to IP addresses, again for remediation and/or other purposes. Even still, in operation 506, the white list is amended to include a remediation server which is adapted for providing updates to various computers, some of which may be necessary for staying in compliance.

In operation 508, additional servers may be added per an administrator. Such additional servers may be defined on a local and/or global basis. Thus, the white list may be configurable by an administrator. Further, while not shown, the white list may be updated to add the server (e.g. see, for example, the server 308 of FIG. 3, etc.) that sends the information to a plurality of the computers. This, of course, allows the instant computer to receive further updates and/or instructions from such server.

Once the white list is established per operations 501-508, operation may continue by monitoring network communications. Specifically, each portion (e.g. packet, frame, byte, etc.) of such network communications may be compared against the white list. See decision 510. For example, a source of each network communication portion may be compared against the white list. If there is a match, such network communication portion may be allowed, per operation 512. On the other hand, if there is not a match, such network communication portion may be blocked, per operation 511.

It should be noted that the foregoing example of white list usage is non-limiting. For example, multiple white lists may be utilized in other embodiments. To this end, in operation 501, one of many white list updates may be received based on any desired criteria including, but not limited to a particular computer group of which the instant computer is a member, etc. Further, as mentioned previously, the white list may include information relating to a nature (e.g. severity, urgency, which policies where violated, etc.) of the policy violation, and/or a description of the activities, behavior, etc. that prompted the violation, etc. To this end, the white list update may be a function of such information. Just by way of example, a more serious or urgent policy violation/behavior may prompt a more stringent white list, etc.

Thus, in one embodiment, a plurality of different subsets of computers may be quarantined from remaining computers and/or subsets on the network, as a function of the computers themselves (e.g. groups associated therewith, etc.) and/or any aspect associated with the corresponding policy violation. Further, the nature of any resultant blocking may further vary based on the foregoing information. For example, a user may be given an option to nevertheless allow a blocked communication, based on any of the above information.

To this end, multiple quarantine zones may be employed. Specifically, one may have a zone defined by subnet, domain name, etc. A computer may then be firewalled from all other computers and, if the computer is communicating with a member of a particular domain, communications may be denied. On the other hand, if the computer with which the aforementioned machine is communicating is a member of a different domain, it may communicate. Therefore, one can create quarantine zones by location, etc., thus providing a "roving" laptop or the like.

Still yet, in various embodiments, the present white list processing of method 500 may be carried out on any computer involved in a particular system. On the other hand, in various other embodiments, the method 500 may be carried out only on out of compliance computers.

Figure 6:
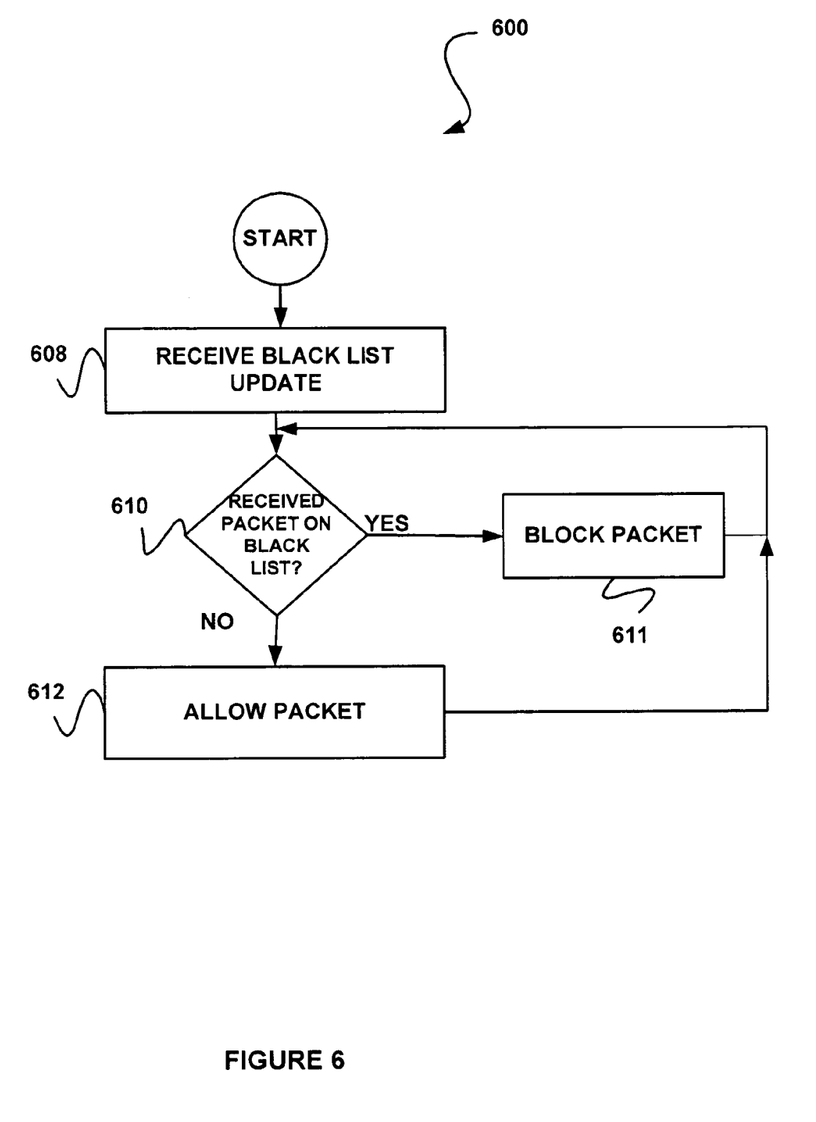
FIG. 6 shows a method for black list processing, in accordance with one embodiment.

FIG. 6 shows a method 600 for black list processing, in accordance with another embodiment. As an option, the present method 600 may be implemented in the context of the architecture and environment of FIGS. 1 and/or 2, and further in the context of the operation 408 of FIG. 4. Of course, however, the method 600 may be carried out in any desired environment.

While not shown, similar to the method 500 of FIG. 5, the associated black list may be "reset," by allowing communication with all computers. Thereafter, a black list update may be carried out in operation 608 for receiving an updated current black list reflecting all computers currently found to be non-compliant with relevant policies.

Once the black list is established per operations 608, operation may continue by monitoring network communications. Specifically, each portion (e.g. packet, frame, byte, etc.) of such network communications may be compared against the black list. See decision 610. For example, a source of each network communication portion may be compared against the black list. If there is a match, such network communication portion may be blocked, per operation 611. On the other hand, if there is not a match, such network communication portion may be allowed, per operation 612.

Similar to the white list processing described in the context of FIG. 5, it should be noted that the foregoing example of black list usage is non-limiting. For example, multiple black lists may be utilized in other embodiments. To this end, in operation 608, one of many black list updates may be received based on any desired criteria including, but not limited to those described earlier in the context of FIG. 5.

Still yet, in various embodiments, the present black list processing of method 600 may be carried out on any computer involved in a particular system. Specifically, in various embodiments, the method 600 may be carried out both on out of compliance computers as well as compliant computers.

Thus, not only may the out of compliance computers be prevented from communicating with other computers, but such other computers may also thwart any network communications with the out of compliance computer. This may be of particular benefit, if a user of the out of compliance computer (or the computer itself) is capable of circumventing the associated firewall.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
    assessing compliancy, based on one or more policies, of at least one subset of computers, each of which include an instance of a scanner, wherein said compliancy is assessed by the respective instance of a scanner;
    receiving, at a server, information over a communication network relating to the at least one subset of computers that are at least potentially out of compliance with the one or more policies, wherein the information is received from the respective instance of a scanner;
    compiling a blacklist utilizing the information, wherein the blacklist identifies the at least one subset of computers; and
    sending, by the server, via the communications network the blacklist to a plurality of other computers,
    wherein network communication involving the at least one subset of computers is controlled at plurality of other computers utilizing the blacklist,
    wherein a network communication involving the at least one subset of computers is controlled utilizing a respective firewall of the at least one subset of computers such that a two-way quarantining is established in order to isolate out of compliance computers, and
    wherein a plurality of different subsets of computers is quarantined as a function of the computers themselves, thereby creating multiple quarantine zones, and
    wherein each of the quarantine zones is defined by domain name and implemented such that one of the computers on the blacklist and included in one of the quarantine zones defined by a first domain is denied from communicating with other computers in the first domain and is allowed to communicate with other computers in a second domain that is different from the first domain, and
    wherein the information identifying the at least one at least potentially out of compliance computer includes an Internet protocol (IP) address, a description of a behavior, and a severity associated with a violation of the policy that resulted in the at least one subset of computers being at least potentially out of compliance with the policy,
    wherein a network communication involving the at least one subset of computers is capable of being controlled utilizing a white list, the white list compiled utilizing the information.

2. The method of claim 1, wherein the information is received periodically.

3. The method of claim 1, wherein the information is sent to the plurality of the computers periodically.

4. The method of claim 1, wherein the information is received upon it being determined that a compliance status of at least one of the computers has changed.

5. The method of claim 1, wherein the information is sent to the plurality of the computers upon it being determined that a compliance status of at least one of the computers has changed.

6. The method of claim 1, wherein the subset of computers is updated based on the information.

7. The method of claim 1, wherein the white list includes a domain name server (DNS).

8. The method of claim 1, wherein the white list includes a Windows Internet name server (WINS).

9. The method of claim 1, wherein the white list includes a remediation server.

10. The method of claim 1, wherein the white list is configurable by an administrator.

11. The method of claim 1, wherein the white list includes a server that sends the information to the plurality of the computers.

12. A computer program product embodied on a non-transitory computer readable storage medium for performing operations, comprising:
    assessing compliancy, based on one or more policies, of at least one subset of computers, each of which include an instance of a scanner, wherein said compliancy is assessed by the respective instance of a scanner;
    receiving, at least one server, information over a communication network relating to the at least one subset of computers that are at least potentially out of compliance with the one or more policies, wherein the information is received from the respective instance of a scanner;
    compiling a blacklist utilizing the information, wherein the blacklist identifies the at least one subset of computers, wherein the blacklist identifies the at least one subset of computers; and
    sending, by the at least one server, via the communication network the blacklist to a plurality of other computers,
    wherein network communications involving the at least one subset of computers is controlled at the plurality of the other computers utilizing the blacklist,
    wherein network communications involving the at least one subset of computers is controlled utilizing a respective firewall of the at least one subset of computers such that a two-way quarantining is established in order to isolate out of compliance computers, and
    wherein a plurality of different subsets of computers is quarantined as a function of the computers themselves, thereby creating multiple quarantine zones, and
    wherein each of the quarantine zones is defined by domain name and implemented such that one of the computers on the blacklist and included in one of the quarantine zones defined by a first domain is denied from communicating with other computers in the first domain and is allowed to communicate with other computers in a second domain that is different from the first domain, and
    wherein the information identifying the at least one at least potentially out of compliance computer includes an Internet protocol (IP) address, a description of a behavior, and a severity associated with a violation of the policy that resulted in the at least one subset of computers being at least potentially out of compliance with the policy,
    wherein the network communication involving the at least one subset of computers is capable of being controlled utilizing a white list, the white list compiled utilizing the information.

13. The method of claim 9, wherein the remediation server is adapted for providing updates to the computers which are necessary for staying in compliance.

14. The method of claim 8, wherein the WINS converts NetBIOS names to IP addresses for remediation purposes.

15. The method of claim 1, where the white list is updated to add the at least one server.

16. The method of claim 1, wherein the compliancy is assessed upon identification of an event that at least potentially impacts the compliancy of the at least one subset of computers.

17. The method of claim 1, wherein a determination of the compliancy is based on whether a particular behavior has been recognized utilizing heuristics.

18. The method of claim 1, wherein the information identifying the at least one at least potentially out of compliance computer further includes user name.

19. The method of claim 1, further comprising resetting the blacklist by allowing communication with all computers by the plurality of the computers, and sending an updated blacklist to the plurality of computers.

20. The method of claim 1, wherein the white list is provided and includes violation information relating to a severity of a policy violation and a description of activities that prompted the policy violation, and is updated as a function of the violation information, such that a more serious policy violation prompts a more stringent white list.

21. The method of claim 1, wherein, when a computer is determined to be compliant with the policy, information relating to the computer's policy compliance is conditionally reported, to a server, depending on whether the computer was out of compliance immediately prior to the determination to preserve bandwidth and processing resources.

22. The method of claim 1, wherein the at least one other subset of the computers identified by the white list thwart network communications with each out of compliance computer to avoid communications with out of compliance computers that are capable of circumventing a firewall.

* * * * *